H. G. LAWTON.
ASPARAGUS KNIFE.
APPLICATION FILED MAR. 21, 1919.
1,316,962.
Patented Sept. 23, 1919.
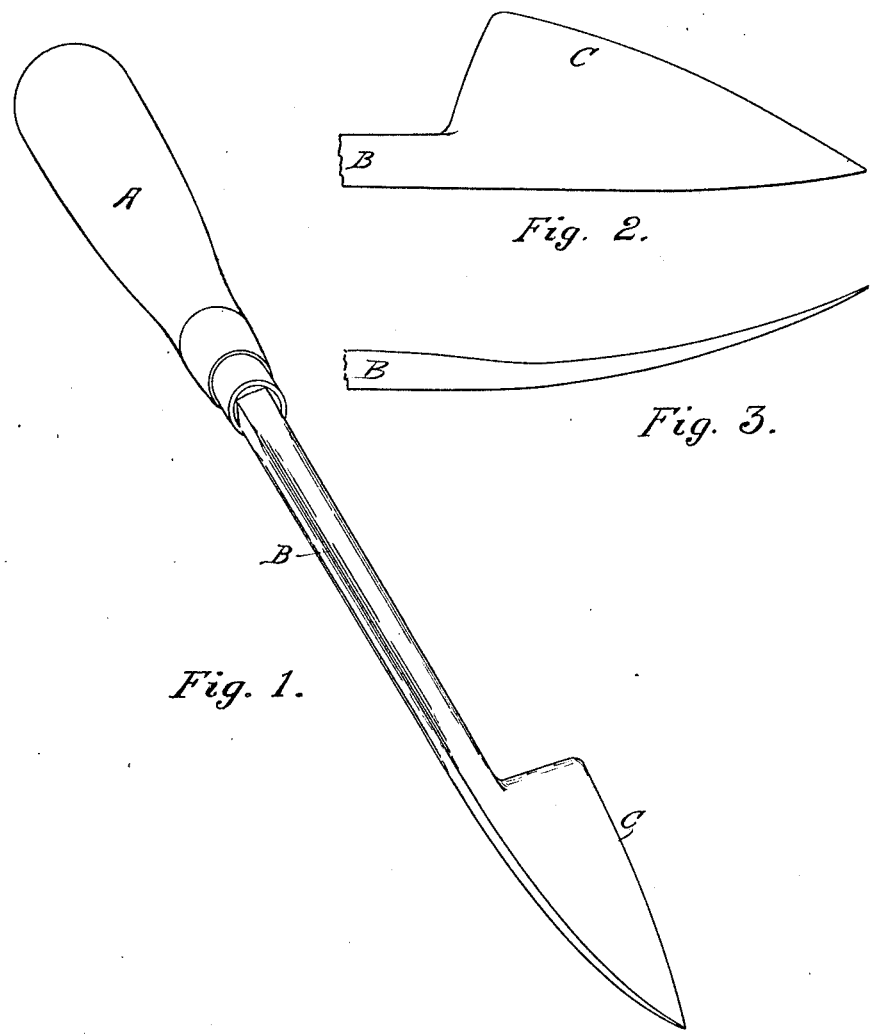

UNITED STATES PATENT OFFICE.

HARWOOD G. LAWTON, OF ALBANY, NEW YORK.

ASPARAGUS-KNIFE.

1,316,962.  Specification of Letters Patent.  Patented Sept. 23, 1919.

Application filed March 21, 1919. Serial No. 284,035.

*To all whom it may concern:*

Be it known that I, HARWOOD G. LAWTON, a citizen of the United States, residing at the city of Albany, in the county of Albany and State of New York, have invented certain new and useful Improvements in Asparagus-Knives, of which the following is a specification.

My invention relates to knives and the object of my invention is to construct a simple and cheap knife which may be used for the cutting of asparagus under the ground where desired without injury to the balance of the plant.

I accomplish this object by means of an asparagus knife as shown in the accompanying drawings, in which—

Figure 1 is a perspective view of my asparagus knife.

Fig. 2 is a detailed view of the cutting portion or blade of my asparagus knife.

Fig. 3 is a back elevation or rear view of the cutting portion of my asparagus knife.

Similar letters refer to similar parts throughout the several views.

Referring to the drawings, A represents the handle of my asparagus knife, B represents the shank of the knife extending from the handle A to the cutting portion C, C represents the edge or cutting portion of my knife.

In cutting asparagus for the market it is desirable to extend the knife in the ground by the side of the stalk to be cut and cut off the stalk of asparagus under the ground but not injure the crown of the plant by so doing.

I construct my asparagus knife with a handle A, of any convenient form or design, for the operator to take hold of. The shank B extending from the handle A to the cutting edge of the knife is straight and of sufficient length to be extended in the ground so that the cutting edge will be at the point where the asparagus is to be cut. The cutting edge is somewhat of the form of a triangle, as shown in Figs. 1 and 2. This cutting portion of the knife has the blade, extending to a point, which may be inserted in the ground. The back of this blade is an extension of the shank B and has a non-cutting edge. The front portion of this blade constitutes a cutting edge.

The operator takes the asparagus knife by the handle and extends the cutting edge downward in the ground by the asparagus stalk and then by a turn of the knife the cutting edge severs the asparagus stalk, at the point desired, without injuring the crown and the crown will continue to grow another stalk, which may be treated in the same way.

I construct my asparagus knife with a slight longitudinal curve to the blade or cutting portion, as shown in Fig. 3, so that a slight turn of the knife, while in the ground by the side of the stalk, will bring the edge of the blade in contact with the stalk and sever the stalk as above described.

Constructed in this way, my asparagus knife is a useful tool to the gardener raising asparagus. The knife is cheap and easy to construct, readily sharpened and simple in operation, and inflicts no permanent injury to the growing plant.

What I claim as my invention and desire to secure by Letters Patent is—

In an asparagus knife, a blade in the form of a triangle longitudinally curved, one segment of the triangle constituting the edge of said blade, the opposite segment of said triangle constituting the rear portion of said blade, a handle, a shank extending from the blade to the handle whereby the turning of said handle will cause the blade to sever the asparagus stalk, substantially as described and for the purposes set forth.

In testimony whereof I have affixed my signature in the presence of two witnesses.

HARWOOD G. LAWTON.

Witnesses:
MINNIE MONTANYE,
WALTER E. WARD.

Copies of this patent may be obtained for five cents each, by addressing the "Commissioner of Patents, Washington, D. C."